United States Patent
Bodziony et al.

(10) Patent No.: US 12,264,303 B1
(45) Date of Patent: Apr. 1, 2025

(54) CULTIVATED ALCOHOL AGING DEVICE AND METHOD

(71) Applicants: Mark Bodziony, Dalton, OH (US); Monte Egon King, Dalton, OH (US)

(72) Inventors: Mark Bodziony, Dalton, OH (US); Monte Egon King, Dalton, OH (US)

(73) Assignee: THEOS WD DISTILLERY LLC, Dalton, OH (US)

( * ) Notice: Subject to any disclaimer, the term of this patent is extended or adjusted under 35 U.S.C. 154(b) by 0 days.

(21) Appl. No.: 18/826,581

(22) Filed: Sep. 6, 2024

Related U.S. Application Data (60) Provisional application No. 63/629,048, filed on Sep. 14, 2023.

(51) Int. Cl.
*C12H 1/22* (2006.01)
*C12H 1/00* (2006.01)

(52) U.S. Cl.
CPC ............... *C12H 1/22* (2013.01); *C12H 1/00* (2013.01)

(58) Field of Classification Search
CPC .................................... C12H 1/22; C12H 1/00
USPC ....................................................... 99/277.1
See application file for complete search history.

(56) References Cited

U.S. PATENT DOCUMENTS

| 262,773 | A | * | 8/1882 | Hohl | 99/277.1 |
|---|---|---|---|---|---|
| 3,083,098 | A | * | 3/1963 | Sullivan | C12H 1/20 217/3 BC |
| 4,211,115 | A | * | 7/1980 | Engebreth | C12L 11/00 99/277.1 |
| 2011/0101010 | A1 | * | 5/2011 | Maiocco | C12H 1/22 99/277.1 |
| 2017/0073140 | A1 | * | 3/2017 | Singh | B67D 7/78 |
| 2020/0231421 | A1 | * | 7/2020 | Singh | B65B 31/00 |

* cited by examiner

*Primary Examiner* — Reginald Alexander
(74) *Attorney, Agent, or Firm* — Emerson, Thomson, & Bennett, LLC; Matt J. Wilson (57) ABSTRACT

Provided herewith is a cultivated alcohol aging device and method. Depicted is a cultivated alcohol aging device for artificially aging alcohol, which apparatus may include an air pressure source, a pipe fitting assembly, a solenoid, an inflatable bladder, a flow tube, a bong-hole stopper, and a vent cap. The method of using the device to artificially age alcohol may include providing an alcohol aging device as above, providing a barrel filled with a volume of alcohol, inserting the inflatable bladder, securing the bong hole stopper, connecting the air pressure source, setting the solenoid to alternate inflation-deflation states, checking the inflation pressure, activating the air pressure source, creating a pressure system, stopping air flow, depressurizing the inflatable bladder, and repeating the steps of activating the air pressure source, creating a pressure system, stopping air flow, and depressurizing the inflatable bladder, according to the time interval.

9 Claims, 7 Drawing Sheets

CULTIVATED ALCOHOL AGING DEVICE AND METHOD

I. BACKGROUND

A. Technical Field

The present disclosure pertains to the art of artificial alcohol aging processes. Specifically, this disclosure teaches an alcohol aging device.

B. Description of Related Art

Currently the barrel aging process for alcohol has not had many changes over the past hundreds of years. The barrels are filled with various types of alcohol at various proofs. The barrels are stored in a barrel house for a determined amount of time. And the ambient daily temperature and humidity draw the alcohol in and out of the inner walls of the barrels. Then, what has not evaporated is re-proofed and bottled for sale.

The alcohol industry is, in part, a time-based business. Alcohol fermentation and distillation processes are short-term and can take several weeks to a few months. But, infusion of various flavors and the alcohol barrel aging process can take much longer, usually many years, or even decades to age a whiskey, wine, or spirit to sufficiently high quality. The length of this process creates a problem of manufacture and production: only a certain quantity of alcoholic drinks can be produced at scale during a fixed, lengthy period of time.

As shown in the below Tables 1 and 2, different sizes of alcohol containers, create different aging ratios. However, the aging process still is a natural factor of time and temperature.

TABLE 1 showing container size relative to converted volume measurements

| Barrel Size | 750 Ml Bottles | Volume 1 Oz Shots | Volume Gallons |
|---|---|---|---|
| 1 Liter | 1 ⅓ | 33.8 | 0.264 |
| 2 Liter | 2 ⅔ | 67.6 | 0.528 |
| 3 Liter | 4 | 101.4 | 0.793 |
| 5 Liter | 6 ⅔ | 169.1 | 1.321 |
| 10 Liter | 13 ⅓ | 338.1 | 2.642 |
| 20 Liter | 26 ⅔ | 676.3 | 5.283 |

TABLE 2 showing aging ratios by volume and internal surface area of container.

| Volume (Liters) | Surface Area (Sq. Inches) | Surface to Volume Ratio | Ratio to 53 Gallon Barrel | Days = 1 year | Weeks = 1 year | Months = 1 year |
|---|---|---|---|---|---|---|
| 1 Liter | 206 | 206 | 6.31 | 58 | 8.24 | 1.9 |
| 2 Liter | 297 | 148 | 4.54 | 80 | 11.45 | 2.64 |
| 3 Liter | 398 | 133 | 4.07 | 90 | 12.79 | 2.95 |
| 5 Liter | 569 | 114 | 3.49 | 105 | 14.92 | 3.44 |
| 10 Liter | 892 | 89 | 2.73 | 134 | 19.04 | 4.39 |
| 20 Liter | 1382 | 69 | 2.12 | 173 | 24.58 | 5.67 |
| 200 Liter or 53 Gallon | 6535 | 33 | 1 | 365 | 52 | 12 |

Numerous solutions to this problem have been attempted throughout the years, most often in the form of artificial aging methods aimed at simulating the taste of an older age alcohol, but produced in less time, or creating an older age alcohol artificially in less time than normal (e.g., producing a whiskey of 10-year quality in only 5 years). One attempted solution is an industry standard aging method called "sea aging." Barrels are placed on a ship for an equivalent of 45 days at sea and return with a 1-year aged alcohol product. This process totally relies on wave movement along with temperature and changing humidity. The process can grant an 80% time saving, or more. However, the sea aging process requires infrastructure, equipment, and procedure—namely a sea, a ship, and sea voyage—that is not readily available to most alcohol spirit manufacturers. And, even having the requisites for sea aging, the process can be prohibitively expensive.

The industry needs a more accessible form of artificial alcohol aging. The present disclosure describes an efficient, cost-effective artificial alcohol aging device and method that is accessible to a broad range of manufacturers and distributors of alcoholic spirits, which provides greater time savings than currently available options.

II. SUMMARY

In accordance with an aspect of the present invention, an alcohol aging device including an air pressure source, a pipe fitting assembly for establishing a flow channel for air from the air pressure source, a solenoid disposed on the air pressure source, and configured to selectively regulate air flow from the air pressure source, an inflatable bladder having a proximal end and a distal end for receiving a volume of air from the air pressure source, a flow tube having a proximal end and a distal end, wherein the flow tube proximal end is connected to the pipe fitting assembly, and the flow tube distal end extends through the inflatable bladder proximal end, a bong-hole stopper disposed on the flow tube proximal end, and having a throughhole configured to create an airtight fit between the bong hole stopper and the flow tube, and a vent cap disposed at the flow tube distal end.

In accordance with another aspect of the present invention, an alcohol aging device as above, wherein the pipe fitting assembly may further include a T-junction having a proximal end, a distal end, and an inlet, a pipe reducer disposed on the T-junction proximal end, a barbed open-end fitting disposed on the pipe reducer, an air hose fitting disposed on the T-junction inlet, and a tube fitting disposed on the distal end of the T-junction.

In accordance with another aspect of the present invention, an alcohol aging device as above, wherein the air pressure source may further include an air tank, an outlet tube extending from the air tank and configured to connect to the T-junction inlet, and an air regulator, and the solenoid may be disposed on the outlet tube between the air tank and the T-junction inlet.

In accordance with another aspect of the present invention, an alcohol aging device as above, wherein the inflatable bladder may further include a cap disposed on the inflatable bladder proximal end, and wherein the cap creates an airtight seal between the inflatable bladder and a volume of alcohol inside a barrel. The inflatable bladder may further include a bladder hole stopper, and the bladder hole stopper may create an airtight seal between the inflatable bladder and a volume of alcohol inside a barrel. The inflatable bladder may be alcohol-compatible. The flow tube may be a one-piece metal tube, or a flexible tube. The flow tube may further include a bladder section, a proximal section, and the dimensions of the flow tube bladder section may be different than the dimensions of the flow tube proximal section. The solenoid may selectively switch between an inflation state and a deflation state, and air flow may pass through the pipe fitting assembly when the solenoid is in the inflation state and air flow to the pipe fitting assembly may be stopped when the solenoid is in the deflation state.

In accordance with another aspect of the present invention, a method of artificially aging alcohol using an alcohol aging device, the steps including providing an alcohol aging device as above, providing a barrel filled with a volume of alcohol, inserting the inflatable bladder and flow tube distal end into the barrel through a barrel bong opening, securing the bong hole stopper into the barrel bong opening, connecting the air pressure source to the pipe fitting assembly, setting the solenoid to alternate between an inflation state and a deflation state at a particular time interval, checking the inflation pressure of the inflatable bladder, activating the air pressure source to provide air flow through the pipe fitting assembly, further through the flow tube, and into the inflatable bladder, creating a pressure system between the inflatable bladder, the barrel, and the volume of alcohol disposed in the barrel, stopping air flow from the air pressure source to the inflatable bladder, depressurizing the inflatable bladder, and repeating the steps of activating the air pressure source, creating a pressure system, stopping air flow, and depressurizing the inflatable bladder, according to the time interval.

In accordance with another aspect of the present invention, a method of artificially aging alcohol using an alcohol aging device wherein the particular time interval is 20 seconds. The pipe fitting assembly may further include a T-junction having a proximal end, a distal end, and an inlet, a pipe reducer disposed on the T-junction proximal end, a barbed open-end fitting disposed on the pipe reducer, an air hose fitting disposed on the T-junction inlet, and a tube fitting disposed on the distal end of the T-junction. The air pressure source may further include an air tank, an outlet tube extending from the air tank and configured to connect to the T-junction inlet, an air regulator, and the solenoid may be disposed on the outlet tube between the air tank and the T-junction inlet.

In accordance with another aspect of the present invention, a method of artificially aging alcohol wherein the inflatable bladder may further include a cap disposed on the inflatable bladder proximal end, and the cap may create an airtight seal for the inflatable bladder. The inflatable bladder may alternatively include a bladder hole stopper, and the bladder hole stopper may create an airtight seal for the inflatable bladder. The inflatable bladder may be alcohol-compatible. The flow tube may be a one-piece metal tube. The flow tube may further include a bladder section, a proximal section, and the dimensions of the flow tube bladder section may be different than the dimensions of the flow tube proximal section.

In accordance with another aspect of the present invention, an alcohol aging device including a pipe fitting assembly for establishing a flow channel for air from the air pressure source, having a T-junction having a proximal end, a distal end, and an inlet, a pipe reducer disposed on the T-junction proximal end, a barbed open-end fitting disposed on the pipe reducer, an air hose fitting disposed on the T-junction inlet, a tube fitting disposed on the distal end of the T-junction, an air pressure source having an air tank, an outlet tube extending from the air tank and configured to connect to the T-junction inlet, an air regulator, a solenoid disposed on the outlet tube between the air tank and the T-junction inlet and configured to selectively regulate air flow from the air pressure source, wherein the solenoid may cycle between an inflation state and a deflation state, an inflatable bladder for receiving air from the air pressure source, via the flow channel, having a proximal end and a distal end and a cap disposed on the inflatable bladder proximal end, wherein the cap creates an airtight seal for the inflatable bladder, a flow tube having a proximal end and a distal end, wherein the flow tube proximal end is connected to the pipe fitting assembly, and the flow tube distal end extends through the inflatable bladder proximal end, wherein the flow tube is a one-piece metal tube, having a bladder section and a proximal section; and wherein the dimensions of the flow tube bladder section are different than the dimensions of the flow tube proximal section, a bong-hole stopper disposed on the flow tube proximal end, and having a throughhole configured to create an airtight fit between the bong hole stopper and the flow tube, and a vent cap disposed at the flow tube distal end.

Other benefits and advantages of this invention will become apparent to those skilled in the art to which it pertains upon reading and understanding of the following detailed specification.

III. BRIEF DESCRIPTION OF THE FIGURES

The above drawings form part of the disclosure and specification and are included to further demonstrate certain aspects of the invention, which aspects will be described in detail later in this specification. The invention may be better understood by reference to these drawings in conjunction with the detailed description.

IV. DETAILED DESCRIPTION

This alcohol aging device duplicates the daily atmospheric pressure conditions that alcohol storage barrels of various sizes are subject to see, given the daily change of temperature occurring from sunrise to sunset during the course of an average 24 hour daily period. When the sunrise occurs, and as temperature and pressure of the alcohol and barrel increases, the alcohol fluid is absorbed into the porous interior of the wood barrel on an average penetration depth of 0.250" to 0.312". This is known as the "absorption" fluid expansion process. When the sun sets and the temperature and pressure of the alcohol and barrel decreases, the barrel contracts and liquid within the wood barrel interior is released back into the volume of alcohol in the barrel. This process is known as the "adsorption" process that extracts the color and sugars and various flavors of the charred interior walls of the barrel back into the liquid alcohol. By simulating and repeating absorption-adsorption rates, the daily "breathing" process of the alcohol and barrel—which gives the alcohol its color, flavor and smoothness parameters—can occur in a much shorter time frame over conventional processes. This alcohol aging device creates a constant movement of the alcohol inside the barrel due to the expansion and collapse of the alcohol aging device.

The alcohol aging device may use an alcohol-compatible inflatable bladder that is sized to match common barrel sizes. The inflatable bladder and components of the alcohol aging device may completely fit into any industry standard 2-inch barrel bong opening without any modification required. The volume of the inflatable bladder may be sized to create a pressure system, in operation, that matches or exceeds the daily absorption depth penetration seen in an average, natural daily absorption-adsorption cycle that makes the fluid absorb into the interior walls of the barrel back into the alcohol. In a nonlimiting example embodiment, by utilizing a calibrated amount of air flow to inflate an example 2-liter sized inflatable bladder in a 53-gallon barrel, the expansion process of the inflatable bladder may expand the entire volume of alcohol fluid approximately 0.625" of a square inch throughout the interior of the barrel. When this occurs, and the inflatable bladder is fully expanded, the pressure may be controlled by a specific time cycle of a solenoid-controlled air pressure source. A barbed orifice attached to the alcohol aging device, which barbed orifice may be ⅛" and continuously vented, may allow for inflation and deflation of the inflatable bladder during a full inflation-deflation cycle of the solenoid.

The solenoid deflation state cycle causes the weight of the fluid inside the barrel to naturally vent air through the barbed orifice, causing the inflatable bladder to collapse within an extremely short time frame, inciting the adsorption process to withdraw the flavors and various sugars from within the interior walls of the barrel at a much faster adsorption rate than normally occurs naturally, and the process is then repeated at particular, short intervals instead of a standard 24-hour time frame, thus creating a continuous duplication of an average seasonal daily alcohol aging process.

A standard yearly time cycle requirement may account for 788,000 cycles per year, roughly 2160 cycles per day. In a nonlimiting example embodiment, in a 53-gallon barrel there is roughly 6535 interior square inches. Inflating a 2-liter inflatable bladder with air, you will expand the liquid in the barrel 0.625" in height over the entire 6535 square inch interior surface area of the barrel. The aging Volume Ratio utilizing a 2-liter barrel to a 53-gallon industry sized oak barrel is 4.54, as determined by the industry standard chart shown in Table 2. The 4.54 industry standard ratio is an 80-day aged industry equivalent equal to one year for a 2-gallon barrel. Utilizing this 4.54 ratio in the alcohol aging device, the 80-day standard may be equal to 172,800 cycles. At 90 cycles, per hour, per day the alcohol aging device may accomplish one year of aging in 21.33 days for a 53-gallon barrel.

Reference is now made to the drawings wherein the showings are for purposes of illustrating embodiments of the article only and not for purposes of limiting the same, and wherein like reference numerals are understood to refer to like components.

FIGS. 1, 2, 3, and 4 depict an alcohol aging device 10 for artificially aging alcohol. The alcohol aging device 10 may include an air pressure source 24, a pipe fitting assembly 12, a solenoid 26 disposed on the air pressure source 24, an inflatable bladder 20 having a proximal end and a distal end, a flow tube 16 having a proximal end and a distal end, a bong-hole stopper 14 disposed on the flow tube 16 proximal end, and a vent cap 22 disposed at the flow tube 16 distal end. The pipe fitting assembly 12 may further include a T-junction 36 having a proximal end, a distal end, and an inlet, a pipe reducer 34 disposed on the T-junction 36 proximal end, a barbed open-end fitting 32 disposed on the pipe reducer 34, an air hose fitting 38 disposed on the T-junction 36 inlet, and a tube fitting 40 disposed on the distal end of the T-junction 36. The air pressure source 24 may further include an air tank 30, an outlet tube 28 extending from the air tank 30, and an air regulator. The solenoid 26 may be disposed on the outlet tube 28 between the air tank 30 and the T-junction 36 inlet. The outlet tube 28 may be configured to connect to the T-junction 36 inlet, via the air hose fitting 38 and a hose, piping, tubing, or other air passage mechanism chosen according to sound engineering judgment. The flow tube 16 proximal end may be connected to the tube fitting 40 of the pipe fitting assembly 12.

The inflatable bladder 20 may further include a cap 18, bladder hole stopper 42, or other sealing mechanism, chosen according to sound engineering judgment, sufficient to create an airtight seal between the inflatable bladder 20 and a volume of alcohol inside an alcohol aging container, including but not limited not a barrel, cask, box, or other container. The cap 18, bladder hole stopper 42, or other sealing mechanism may be disposed on the inflatable bladder 20 proximal end. The flow tube 16 distal end may extend through the inflatable bladder 20 proximal end. Additionally, the inflatable bladder 20 may be alcohol-compatible, composed of a material that does not dissolve in ethanol, which is "taste-neutral," meaning it does not infuse alcohol in the alcohol aging container with any flavor of rubber, plastic, or other extraneous tastes not directly derived from the alcohol aging container during the adsorption process. The inflatable bladder may be made of food-grade plastic. The flow tube 16 may be a one-piece metal tube, a flexible tube—made of plastic, rubber, or other airtight pliable material chosen according to sound engineering judgment—or further include a bladder section and a proximal section, as according to sound engineering judgment. In an embodiment of the present device, wherein the flow tube 16 includes a bladder section and a proximal section, the bladder section may be disposed within the inflatable bladder 20, and the dimensions of the bladder section may be different than the dimensions of the proximal section.

The barbed open-end fitting 32, in conjunction with the solenoid 26 may allow the inflatable bladder 20 to inflate and deflate in time with solenoid 26 time cycles, as disclosed further below. The barbed open-end fitting 32 may be open to the atmosphere. The weight of the volume of alcohol may collapse the inflatable bladder 20 when no air is supplied to the inflatable bladder 20. The barbed open-end fitting 32 may also allow a user to check air pressure to the alcohol aging device 10 with an electronic water manometer to adjust the air regulator to a desired pressure.

In an exemplary embodiment, using a barrel 50 as the alcohol aging container, the various features of the alcohol aging device 10 may interact with each other to artificially age a volume of alcohol, as described in further detail below. By expanding and deflating the inflatable bladder 20 inside a barrel 50 at a pressure of compressed air volume, the alcohol aging device 10 may match a daily absorption (expansion) and adsorption (reduction) rate that is naturally produced during any given seasonal daily temperature and humidity conditions. This may allow the barrel 50 to facilitate the absorption of alcohol into the wall of the entire barrel 50 at an enhanced rate. In a particular embodiment, the enhanced rate may be 90 inflation-deflation cycles per hour. The device may be configured for any orientation of the barrel 50 itself, including horizontal, vertical, or any other orientation chosen according to sound engineering judgment.

Figure 1:
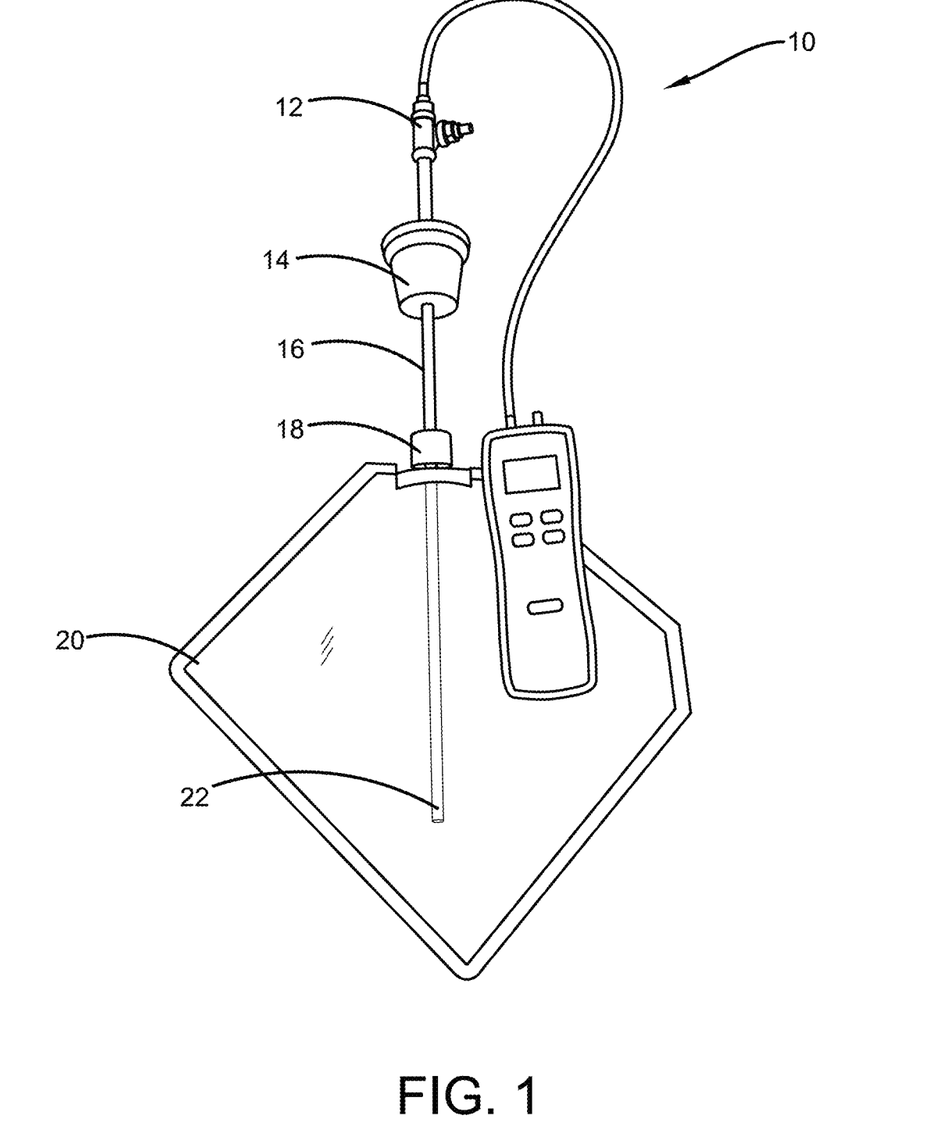
FIG. 1 is a front view of the alcohol aging device 10 pipe fitting assembly 12, inflatable bladder 20, flow tube 16, bong-hole stopper 14, and vent cap 22 in a particular embodiment of the invention.
Figure 2:
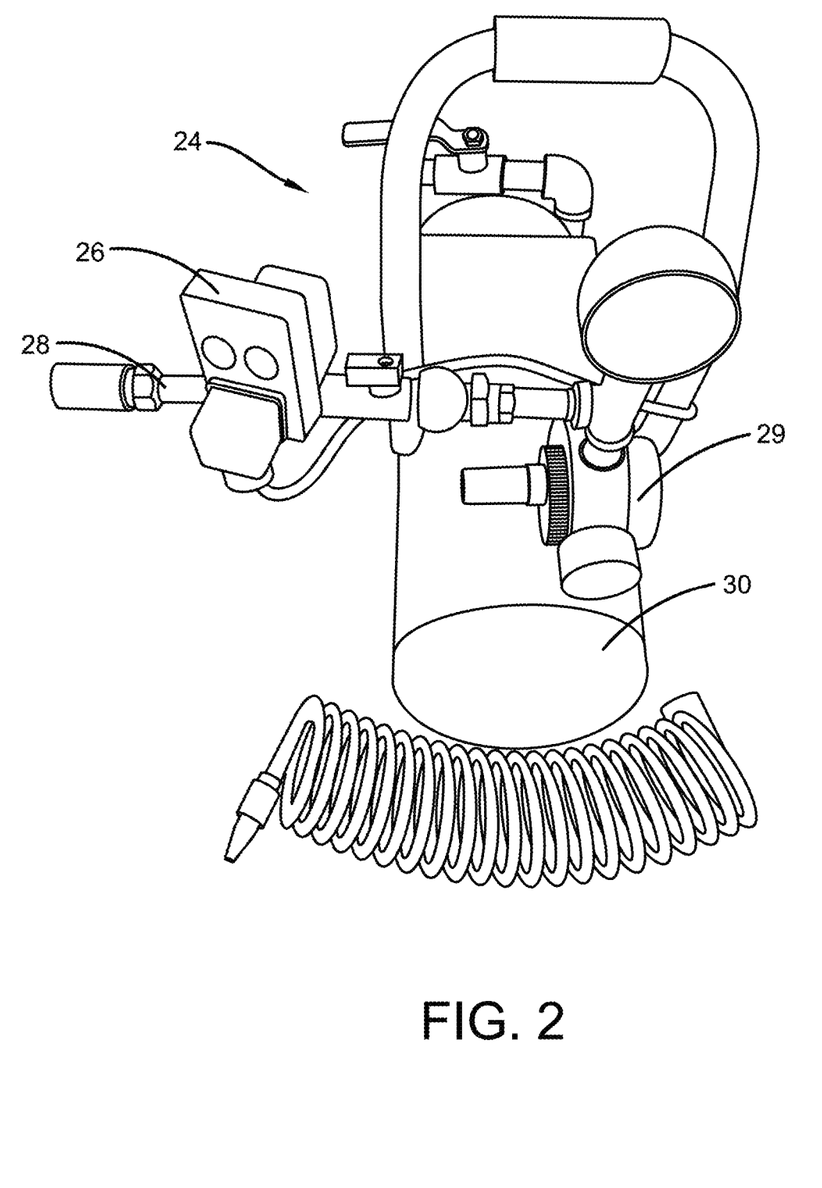
FIG. 2 is a perspective view of the alcohol aging device 10 air pressure source 24 in the particular embodiment of the invention seen in FIG. 1.
Figure 3:
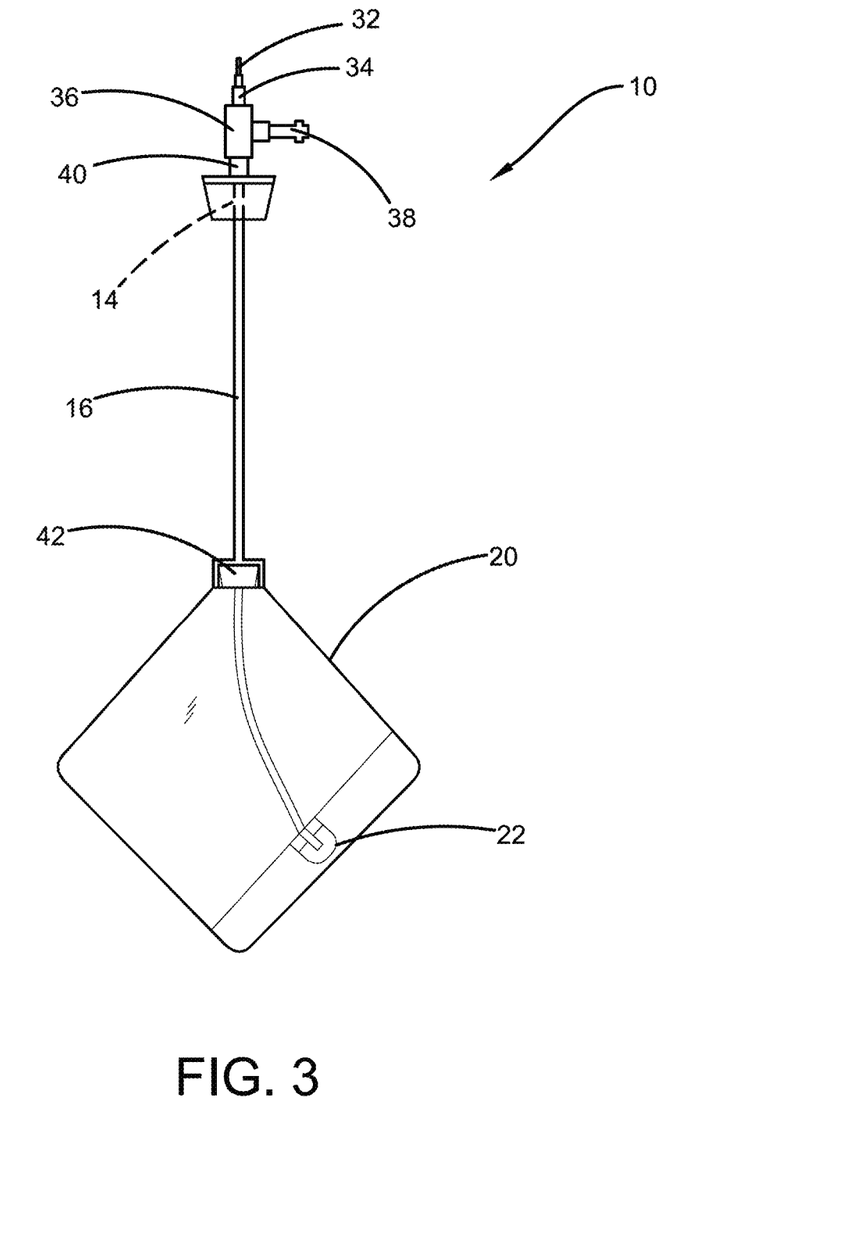
FIG. 3 is a front view of the alcohol aging device 10 pipe fitting assembly 12, inflatable bladder 20, flow tube 16, bong-hole stopper 14, and vent cap 22 in another embodiment of the invention.
Figure 4:
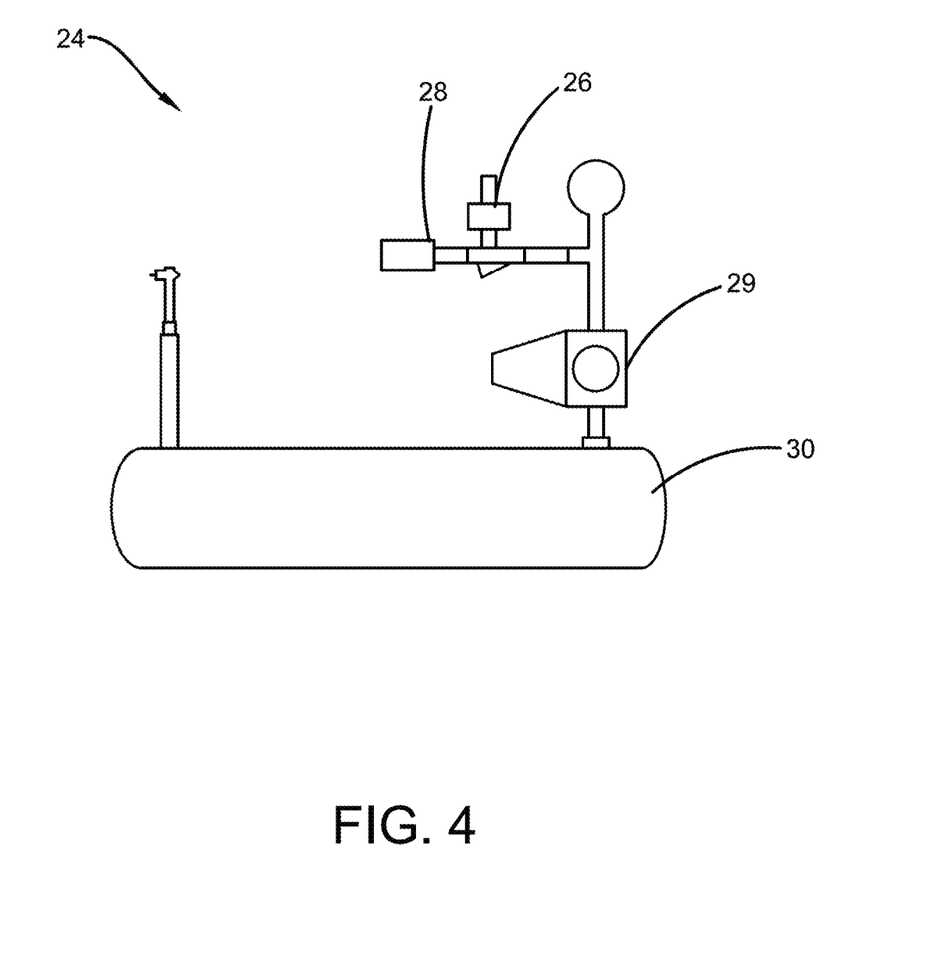
FIG. 4 is a front view of the alcohol aging device 10 air pressure source 24 in the particular embodiment of the invention seen in FIG. 3.
Figure 5:
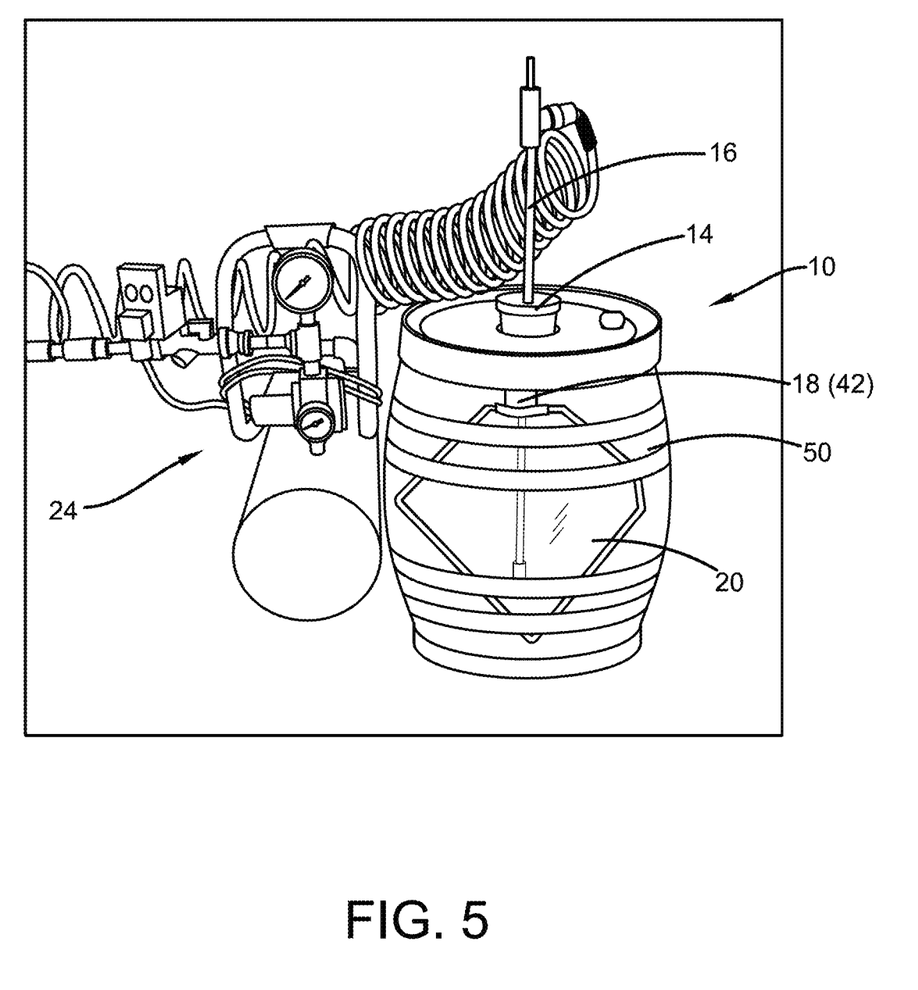
FIG. 5 is a front view of the alcohol aging device 10 and alcohol aging device air pressure source 24 installed in an alcohol container, including a cutaway view of the alcohol container interior.
Figure 6:
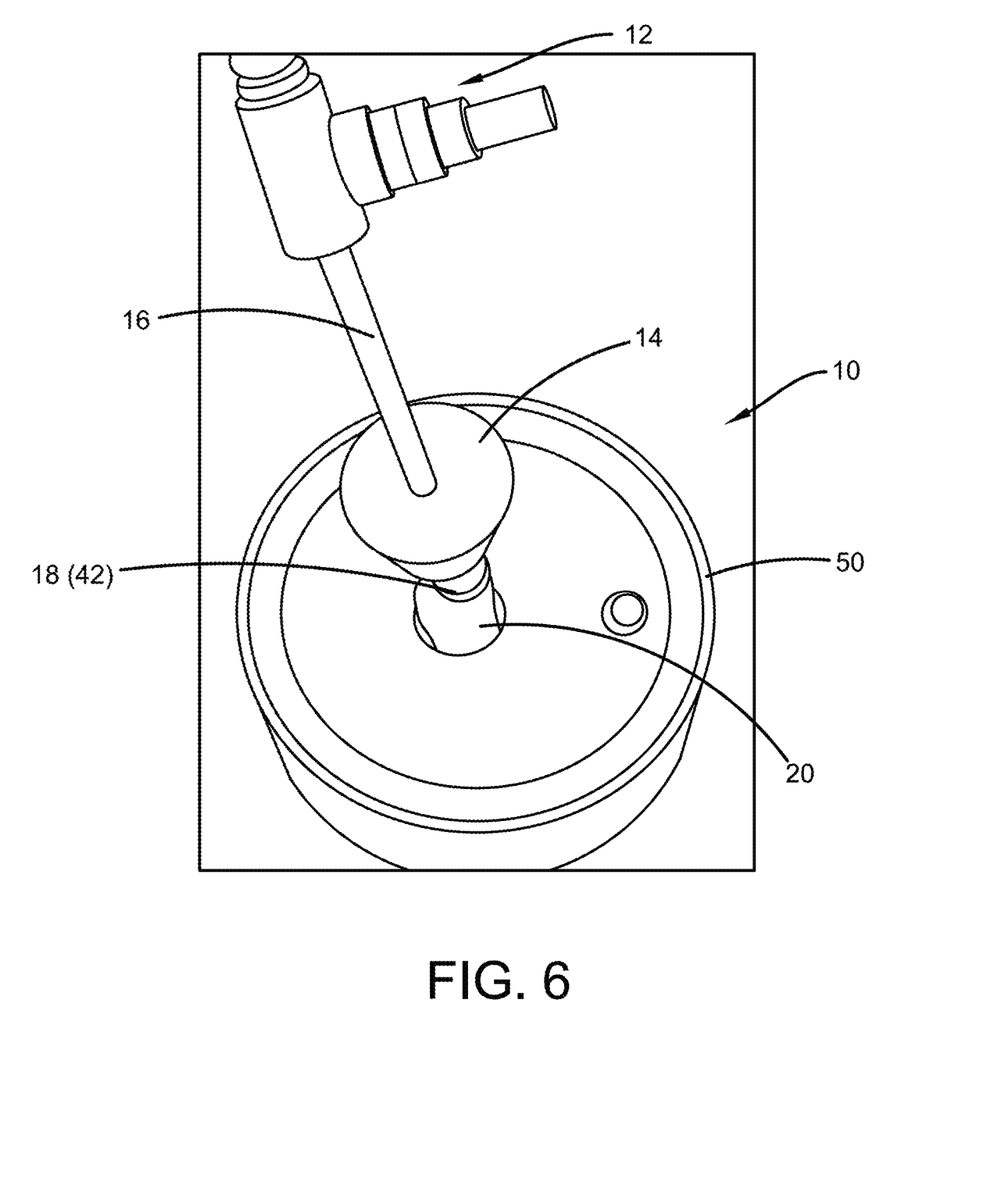
FIG. 6 is a top view of the alcohol aging device 10 being installed in an alcohol container.
Figure 7:
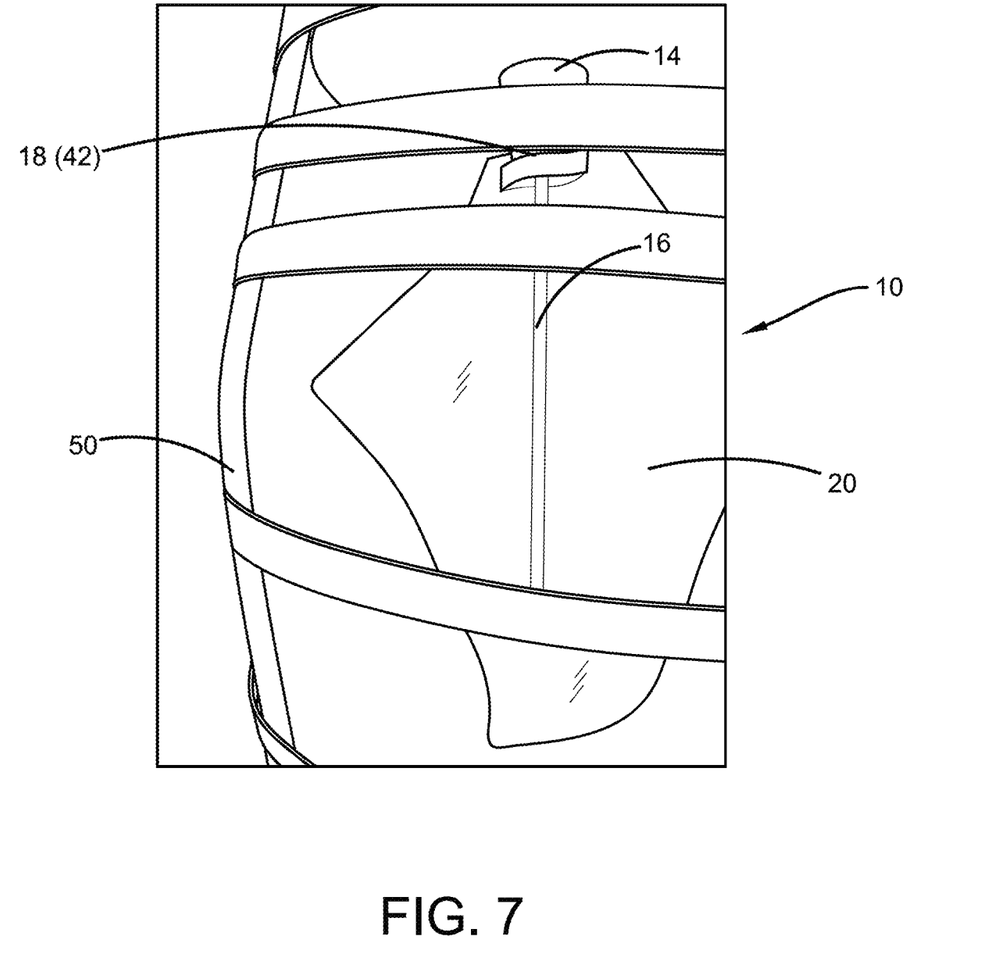
FIG. 7 is a front, close-up view of the alcohol aging device 10 installed in an alcohol container, including a cutaway view of the alcohol container interior.

With reference now to FIGS. 5, 6, & 7, and in a particular embodiment, the bong-hole stopper 14 includes a through-hole configured to create an airtight fit between the bong hole stopper and the flow tube 16. The inflatable bladder 20 and flow tube 16 distal end are inserted into a barrel 50 filled with a volume of alcohol through a barrel bong opening. The bong hole stopper is secured within the barrel bong opening. The air pressure source 24 is connected to the pipe fitting assembly 12, and the solenoid 26 is set to alternate between an inflation state and a deflation state and may be configured to alternate at a particular time interval. Time intervals for the duration of each of the solenoid 26 inflation state and deflation state may be different from each other. The time intervals themselves may be any duration chosen according to sound engineering judgment and the desired artificial barrel aging timeframe. The inflation state may continue, for the duration of the inflation state time interval, to inflate the inflatable bladder 20 until the inflatable bladder 20 is fully inflated. The deflation state may continue, for the duration of the deflation state time interval, to deflate the inflatable bladder 20 until the inflatable bladder 20 is fully deflated. In another particular embodiment, the inflation state time interval may be 20 seconds in duration, and the deflation state time interval may be 40 seconds in duration. In yet another embodiment, the inflation state time interval may be 20 seconds in duration, and the deflation state time interval may be 6 seconds in duration.

With reference to FIGS. 1, 2, 3, 4, 5, 6, & 7, after activating the air pressure source 24 to provide air flow, the air pressure source 24 provides an air flow from the air tank 30, through the outlet tube 28 extending from the air tank 30. The air pressure regulator keeps the air flow constant, as the solenoid 26 selectively regulates air flow from the air pressure source 24. The solenoid 26 may energize to allow airflow through the outlet tube 28, from the air pressure source 24. The air flows from the outlet tube 28 into the T-junction 36 inlet of the pipe fitting assembly 12, out from the T-junction 36 distal end, and into the flow tube 16 proximal end. The air flow continues from the flow tube 16 proximal end into the flow tube 16 distal end. As air flow passes into the inflatable bladder 20, the inflatable bladder 20 inflates, creating a pressure system between the inflatable bladder 20, the barrel 50, and the volume of alcohol disposed in the barrel 50. The cap 18, bladder hole stopper 42, or other sealing mechanism creates an airtight seal between the inflatable bladder 20 and a volume of alcohol inside a barrel 50, allowing the inflatable bladder 20 to maintain the requisite air pressure in the pressure system. The pressure system, itself, may be created from the interaction between the internal surface area of the barrel 50, the precise volume of alcohol in the barrel 50, and the size of the inflatable bladder 20. Each of those factors, proportional to each other, may facilitate a pressure within a particular range of inches wc. In another particular embodiment, the particular range may be between 44-72 inches wc, including 44 and 72 inches wc. After the solenoid's inflation state time interval has elapsed, the solenoid 26 de-energizes into its deflation state, stopping the air flow into the inflatable bladder 20. As the inflatable bladder 20 depressurizes, the ambient pressure conditions within the barrel 50 cause the pressure system to return to a state of equilibrium, simulating the adsorption of alcohol out of the internal wood of the barrel 50 and back into volume of alcohol. After the solenoid's deflation state time interval elapses, the above process may repeat for a number of cycles chosen according to sound engineering judgment and the desired artificial barrel aging timeframe. Different size barrels may accept different sized bladders and still maintain an internal pressure in the barrel, in a particular embodiment ranging from 44-72 inch wc.

While the above arrangement of pipe fitting assembly 12 features is disclosed in this embodiment, it should be noted that the alcohol aging device 10 may include any arrangement and combination of the above features to establish an air flow within the device, without deviation from the core concepts of the alcohol aging device 10 and its function.

A method of artificially aging alcohol using the alcohol aging device 10 involves application of the above features, interactions, and processes. The embodiment of a particular method of artificially aging alcohol may further include checking the inflation pressure of the inflatable bladder 20, via a manometer or other air pressure reader or gauge, as the inflatable bladder 20 may have a particular cycles-to-failure rating, based upon the average pressure the inflatable bladder 20 experiences during its lifetime use. In a particular embodiment, the inflatable bladder 20 may be rated for a minimum of 50,000 cycles with no leakage issues. The alcohol aging device 10 may be configured to age multiple barrels at the same time via alternative arrangements and quantities of the above air pressure source 24 and pipe fitting assembly 12 features, chosen according to sound engineering judgment. For an embodiment configured to age multiple barrels, the barrels may be aged simultaneously or at variable time intervals. The alcohol aging device 10 may be configured to utilize existing, industry-standard alcohol containment barrels.

Another embodiment of a particular method of artificially aging alcohol may include determining if the alcohol aging container, a barrel 50 in this embodiment, containing the volume of alcohol will be mounted in a vertical or horizontal position. Then, removing the barrel bong on top of the barrel 50 and rolling the inflatable bladder 20 into a rolled position so it easily fits into the barrel bong. As necessary, the barrel bong stopper may be adjusted by sliding the barrel bong stopper up or down along the length of the flow tube 16 to account for the barrel 50 position and height and to fit in the barrel bong opening, allowing at least 2" of space between the bladder and the bottom of the barrel 50. Once the alcohol aging device 10 is inside the barrel 50, the user can insert barrel bong stopper to reseal the barrel opening. Next, the air pressure source 24 may be connected to the alcohol aging device 10. Various arrangements and quantities of the air pressure source 24 and pipe fitting assembly 12 features may be utilized as long as they produce a pressure within a particular range of inches wc, that range chosen according to sound engineering judgment and the desired artificial barrel aging timeframe. Then, identify the air regulator on the air pressure source 24 is set at zero by reading a gauge disposed on the regulator. Next, the user may activate the air pressure source 24 and connect an air-line from an air compressor disposed on the air pressure source 24 to a 2-gallon air tank 30 disposed on the air pressure source 24. The air pressure source 24 in this embodiment may provide a maximum pressure of 30 psi. An isolation valve may be used to selectively regulate the air flow from the air pressure source 24 to the alcohol aging device 10. Next, the solenoid 26 may be configured to have an inflation state duration of 20 seconds and a deflation state duration of 20 seconds, to a total of minimum 40 seconds. Next, the user may connect the solenoid 26 to the air hose fitting 38. Then, checking the inflation pressure of the inflatable bladder 20 using a manometer to check that the combined expansion pressure of the inflatable bladder 20 and flow tube 16 is approximately 44 inches wc. Finally, the manometer tube can be removed from the vent and the alcohol aging device 10 is ready for operation.

Numerous aspects have been described, hereinabove. While the alcohol aging device 10 provided herein has been described in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined to provide the desired characteristics. It will be apparent to those skilled in the art that the above methods and apparatuses may incorporate changes and modifications without departing from the spirit and scope of the present disclosure. It is intended to include all such modifications and alterations in so far as they come within the scope of the appended claims or the equivalents thereof. Therefore, the holder apparatus should not be limited to any single embodiment, but rather construed in breadth and scope in accordance with the recitations of the appended claims.

What is claimed:

1. An alcohol aging device comprising:
   an air pressure source;
   a pipe fitting assembly for establishing a flow channel for air from the air pressure source;
   a solenoid disposed on the air pressure source, and configured to selectively regulate air flow from the air pressure source;
   an inflatable bladder having a proximal end and a distal end for receiving a volume of air from the air pressure source;
   a flow tube having a proximal end and a distal end, wherein the flow tube proximal end is connected to the pipe fitting assembly, and the flow tube distal end extends through the inflatable bladder proximal end;
   a bong-hole stopper disposed on the flow tube proximal end, and having a throughhole configured to create an airtight fit between the bong hole stopper and the flow tube;
   a vent cap disposed at the flow tube distal end;
   wherein the inflatable bladder further comprises a bladder hole stopper; and
   wherein the bladder hole stopper creates an airtight seal between the inflatable bladder and a volume of alcohol inside a barrel.

2. An alcohol aging device as in claim 1, wherein the pipe fitting assembly further comprises:
   a T-junction having a proximal end, a distal end, and an inlet;
   a pipe reducer disposed on the T-junction proximal end;
   a barbed open-end fitting disposed on the pipe reducer;
   an air hose fitting disposed on the T-junction inlet; and
   a tube fitting disposed on the distal end of the T-junction.

3. An alcohol aging device as in claim 2, wherein the air pressure source further comprises:
   an air tank;
   an outlet tube extending from the air tank and configured to connect to the T-junction inlet;
   an air regulator; and
   wherein the solenoid is disposed on the outlet tube between the air tank and the T-junction inlet.

4. An alcohol aging device as in claim 1, wherein the inflatable bladder is alcohol-compatible.

5. An alcohol aging device as in claim 1, wherein the flow tube is a one-piece metal tube.

6. An alcohol aging device as in claim 1, wherein the flow tube is a flexible tube.

7. An alcohol aging device as in claim 1, wherein the flow tube further comprises:
   a bladder section;
   a proximal section; and
   wherein the dimensions of the flow tube bladder section are different than the dimensions of the flow tube proximal section.

8. An alcohol aging device as in claim 1, wherein:
   the solenoid selectively switches between an inflation state and a deflation state; and
   wherein air flow passes through the pipe fitting assembly when the solenoid is in the inflation state and air flow to the pipe fitting assembly is stopped when the solenoid is in the deflation state.

9. An alcohol aging device comprising:
   a pipe fitting assembly for establishing a flow channel for air from an air pressure source, having:
     a T-junction having a proximal end, a distal end, and an inlet;
     a pipe reducer disposed on the T-junction proximal end;
     a barbed open-end fitting disposed on the pipe reducer;
     an air hose fitting disposed on the T-junction inlet;
     a tube fitting disposed on the distal end of the T-junction;
     wherein the air pressure source has:
       an air tank;
       an outlet tube extending from the air tank and configured to connect to the T-junction inlet;
       an air regulator;
       a solenoid disposed on the outlet tube between the air tank and the T-junction inlet and configured to selectively regulate air flow from the air pressure source;
       wherein the solenoid cycles between an inflation state and a deflation state;
   an inflatable bladder for receiving air from the air pressure source, via the flow channel, having a proximal end and a distal end;

wherein the inflatable bladder further comprises a bladder hole stopper;
wherein the bladder hole stopper creates an airtight seal between the inflatable bladder and a volume of alcohol inside a barrel;
a flow tube having a proximal end and a distal end, wherein the flow tube proximal end is connected to the pipe fitting assembly, and the flow tube distal end extends through the inflatable bladder proximal end;
wherein the flow tube is a one-piece metal tube, having a bladder section and a proximal section; and wherein the dimensions of the flow tube bladder section are different than the dimensions of the flow tube proximal section;
a bong-hole stopper disposed on the flow tube proximal end, and having a throughhole configured to create an airtight fit between the bong hole stopper and the flow tube; and
a vent cap disposed at the flow tube distal end.

* * * * *